United States Patent
Bai et al.

(10) Patent No.: US 8,930,728 B1
(45) Date of Patent: *Jan. 6, 2015

(54) SYSTEM AND METHOD FOR SELECTING A POWER MANAGEMENT CONFIGURATION IN A MULTI-CORE ENVIRONMENT TO BALANCE CURRENT LOAD DEMAND AND REQUIRED POWER CONSUMPTION

(71) Applicant: Marvell International Ltd., Hamilton (BM)

(72) Inventors: Yu Bai, Shrewsbury, MA (US); Marlon Moncrieffe, Leominster, MA (US); Bryan Morgan, Lunenburg, MA (US); Scott B. Peirce, Shrewsbury, MA (US); Premanand Sakarda, Acton, MA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/212,085

(22) Filed: Mar. 14, 2014

Related U.S. Application Data

(63) Continuation of application No. 13/216,928, filed on Aug. 24, 2011, now Pat. No. 8,689,021.

(60) Provisional application No. 61/381,816, filed on Sep. 10, 2010.

(51) Int. Cl.
- *G06F 1/00* (2006.01)
- *G06F 1/28* (2006.01)
- *G06F 1/26* (2006.01)
- *G06F 9/50* (2006.01)

(52) U.S. Cl.
CPC .. *G06F 1/28* (2013.01); *G06F 1/26* (2013.01); *G06F 9/50* (2013.01)
USPC .......................................................... 713/300

(58) Field of Classification Search
CPC ..................................... G06F 1/26; G06F 9/50
See application file for complete search history.

(56) References Cited

U.S. PATENT DOCUMENTS

| | | | |
|---|---|---|---|
| 2006/0095807 A1* | 5/2006 | Grochowski et al. | 713/324 |
| 2008/0059816 A1* | 3/2008 | Paniagua et al. | 713/300 |
| 2008/0229127 A1* | 9/2008 | Felter et al. | 713/320 |
| 2010/0057404 A1* | 3/2010 | Dittmann et al. | 702/186 |
| 2010/0138837 A1* | 6/2010 | Olsson et al. | 718/102 |
| 2011/0080414 A1* | 4/2011 | Wang | 345/502 |

* cited by examiner

*Primary Examiner* — Thomas Lee
*Assistant Examiner* — Zhipeng Wang

(57) ABSTRACT

Some of the embodiments of the present disclosure provide a method comprising generating a plurality of power profiles for a corresponding plurality of processing cores, wherein each power profile of the plurality of power profiles includes power consumptions of a corresponding processing core under various operating conditions; generating a plurality of candidate configurations, wherein each candidate configuration comprises corresponding candidate operating conditions for the plurality of processing cores; and based at least in part on the plurality of power profiles, selecting a first candidate configuration of the plurality of candidate configurations for managing the plurality of processing cores. Other embodiments are also described and claimed.

20 Claims, 4 Drawing Sheets

| Candidate Configuration | Configuration Lookup Table 32 ||||||||||||||||
|---|---|---|---|---|---|---|---|---|---|---|---|---|---|---|---|---|
| | Configurations for Core 12A |||| Configurations for Core 12B |||| Configurations for Core 12C |||| Configurations for Core 12D ||||
| | Status | Frequency | Voltage | Utilization | Status | Frequency | Voltage | Utilization | Status | Frequency | Voltage | Utilization | Status | Frequency | Voltage | Utilization |
| Candidate Configuration 1 | On | 200 MHz | 1V | 20% | On | 100 MHz | 1V | 50% | On | 100 MHz | 1V | 45% | On | 200 MHz | 1V | 25% |
| Candidate Configuration 2 | On | 400 MHz | 1V | 92.5% | Off | - | - | - | Off | - | - | - | Off | - | - | - |
| Candidate Configuration 3 | Off | - | - | - | Off | - | - | - | On | 150 MHz | 0.8V | 60% | On | 250MHz | 1V | 96% |
| | ..... Candidate configuration 4 ..... ||||||||||||||||
| | ..... Candidate configuration M ..... ||||||||||||||||

Table 200

| Power profile table for operating voltage v1 | | |
|---|---|---|
| Core number | Power mode | Power consumption |
| Core 12A | Active power mode | AP_A_fa1, AP_A_fa2, ...., AP_A_fan |
| Core 12A | Idle power mode | IP_A_fa1, IP_A_fa2, ..., IP_A_fan |
| Core 12B | Active power mode | AP_B_fb1, AP_B_fb2, ..., AP_B_fbn |
| Core 12B | Idle power mode | IP_B_fb1, IP_B_fb2, ..., IP_B_fbn |
| Core 12C | Active power mode | AP_C_fc1, AP_C_fc2, ..., AP_C_fcn |
| Core 12C | Idle power mode | IP_C_fc1, IP_C_fc2, ..., IP_C_fcn |
| Core 12D | Active power mode | AP_D_fd1, AP_D_fd2, ..., AP_D_fdn |
| Core 12B | Idle power mode | IP_D_fd1, IP_D_fd2, ..., IP_D_fdn |

1st row
2nd row
· · · ·
8th row

Fig. 2

| Configuration Lookup Table 32 | | | | | | | | | | | | | |
|---|---|---|---|---|---|---|---|---|---|---|---|---|---|
| Configurations for Core 12A | | | | Configurations for Core 12B | | | | Configurations for Core 12C | | | | Configurations for Core 12D | |
| Status | Frequency | Voltage | Utilization | Status | Frequency | Voltage | Utilization | Status | Frequency | Voltage | Utilization | Status | Frequency | Voltage | Utilization |
| On | 200 MHz | 1V | 20% | On | 100 MHz | 1V | 50% | On | 100 MHz | 1V | 45% | On | 200 MHz | 1V | 25% |
| On | 400 MHz | 1V | 92.5% | Off | - | - | - | Off | - | - | - | Off | - | - | - |
| Off | - | - | - | Off | - | - | - | On | 150 MHz | 0.8V | 60% | On | 250 MHz | 1V | 96% |
| ... | | | | Candidate configuration 4 ... | | | | ... | | | | ... | | | |
| | | | | Candidate configuration M ... | | | | | | | | | | | |

Candidate Configuration 1 →
Candidate Configuration 2 →
Candidate Configuration 3 →

Fig. 3

SYSTEM AND METHOD FOR SELECTING A POWER MANAGEMENT CONFIGURATION IN A MULTI-CORE ENVIRONMENT TO BALANCE CURRENT LOAD DEMAND AND REQUIRED POWER CONSUMPTION

CROSS REFERENCE TO RELATED APPLICATIONS

The present disclosure is a continuation of and claims priority to U.S. patent application Ser. No. 13/216,928, filed Aug. 24, 2011, now U.S. Pat. No. 8,689,021, issued Apr. 1, 2014, which claims priority to U.S. Patent Application No. 61/381,816, filed Sep. 10, 2010, which are incorporated herein by reference.

TECHNICAL FIELD

Embodiments of the present disclosure relate to a multi-core environment that includes multiple processing cores, and more specifically, to power management in a multi-core environment.

BACKGROUND

Unless otherwise indicated herein, the approaches described in this section are not prior art to the claims in the present disclosure and are not admitted to be prior art by inclusion in this section.

In a computing system with multiple processing cores, a workload of the computing system is generally distributed among the processing cores. For example, the workload can be distributed substantially equally (e.g., to the extent possible) among the processing cores. However, such distribution of workload among the processing cores does not take into account, or try to reduce power consumptions of the processing cores and/or a combined power consumption of the computing system.

SUMMARY

In various embodiments, the present disclosure provides a method comprising generating a plurality of power profiles for a corresponding plurality of processing cores, wherein each power profile of the plurality of power profiles includes power consumptions of a corresponding processing core under various operating conditions; generating a plurality of candidate configurations, wherein each candidate configuration comprises corresponding candidate operating conditions for the plurality of processing cores; and based at least in part on the plurality of power profiles, selecting a first candidate configuration of the plurality of candidate configurations for managing the plurality of processing cores.

In an embodiment, there is also provided a computing system comprising a plurality of processing cores; a plurality of power profiler modules corresponding to the plurality of processing cores, wherein each power profiler module is configured to generate a power profile for a corresponding processing core, and wherein a power profile includes power consumptions of the corresponding processing core under various operating conditions; a configuration lookup table module configured to generate a configuration lookup table, wherein the configuration lookup table comprises a plurality of candidate configurations, and wherein each candidate configuration of the plurality of candidate configurations comprises corresponding operating conditions of the plurality of processing cores; and a policy management module configured to, based at least in part on a plurality of power profiles, select a first candidate configuration of the plurality of candidate configurations to facilitate managing the plurality of processing cores.

In an embodiment, there is also provided a method comprising determining a plurality of candidate configurations, wherein each candidate configuration comprises corresponding operating conditions for a plurality of processing cores; determining a plurality of combined power consumptions corresponding to the plurality of candidate configurations, wherein for a candidate configuration, the corresponding combined power consumption is an indication of power consumed by the plurality of processing cores under the operating conditions of the corresponding candidate configuration; determining that a first candidate configuration has a substantially minimum combined power consumption of the plurality of combined power consumptions; and based on determining that the first candidate configuration has the substantially minimum combined power consumption, selecting the first candidate configuration of the plurality of candidate configurations for managing the plurality of processing cores.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIG. 2 illustrates an example table illustrating a plurality of power profiles for a plurality of processing cores, in accordance with an embodiment of the present disclosure.

FIG. 3 illustrates a configuration look up table, in accordance with an embodiment of the present disclosure.

DETAILED DESCRIPTION

Figure 1:
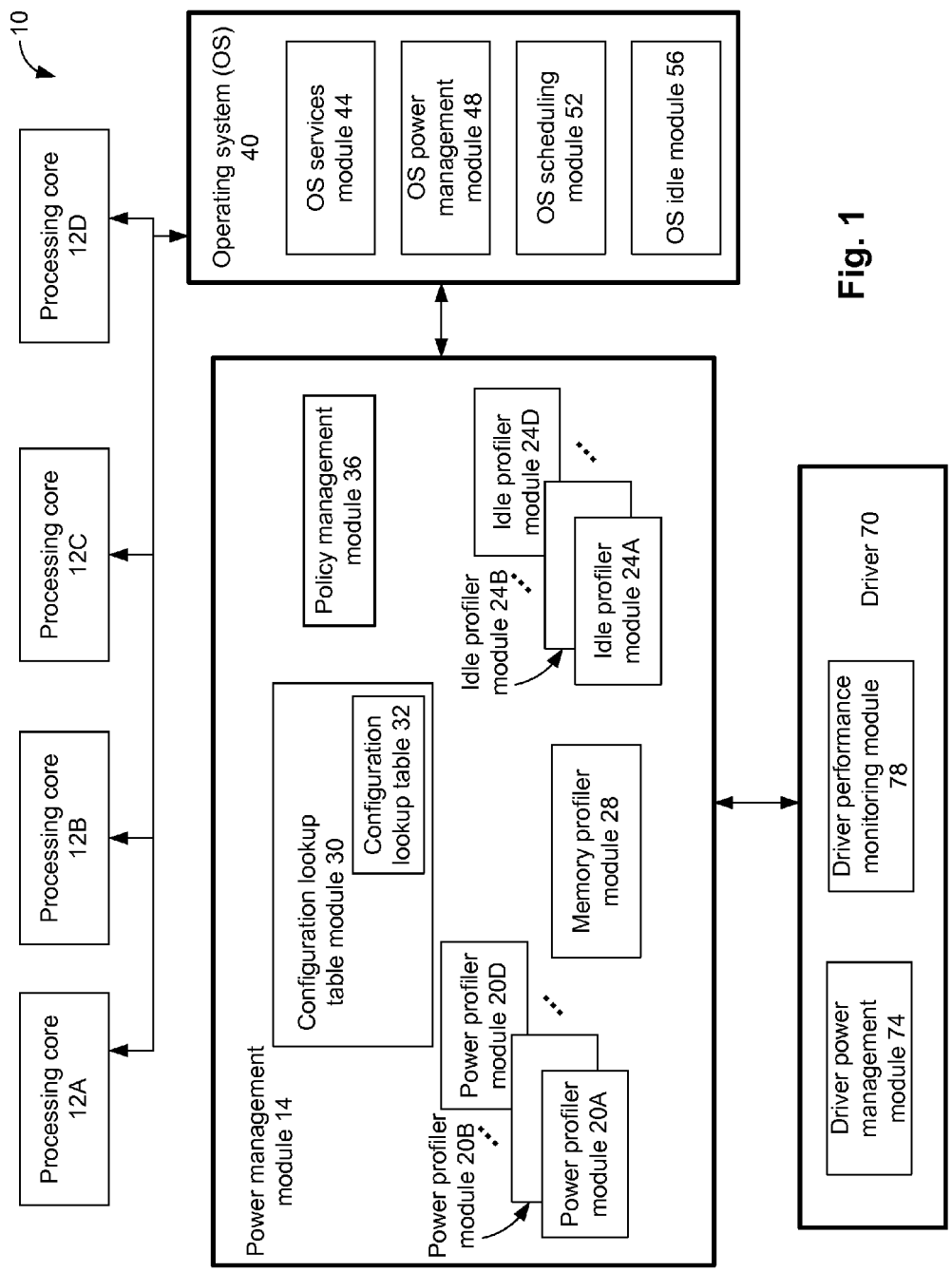
FIG. 1 schematically illustrates a computing system, in accordance with an embodiment of the present disclosure.

FIG. 1 schematically illustrates a computing system 10, in accordance with an embodiment of the present disclosure. The computing system 10 is a multi-core processing system and includes processing core 12A, processing core 12B, processing core 12C and processing core 12D (also referred to herein as cores 12A, 12B, 12C and 12D, respectively). Although the computing system 10 includes four processing cores, in various other embodiments, the computing system 10 can include any other appropriate number of processing cores. In various embodiments, one or more components of the computing system 10 are included in a system on a chip (SOC).

The computing system 10, including the processing cores 12A, ..., 12D, runs an operating system (OS) 40. In various embodiments, the OS 40 is any appropriate type of OS that is configured to operate on a multi-core environment. In various embodiments, the OS 40 includes an OS service module 44, an OS power management module 48, an OS scheduler module 52 and an OS idle module 56, each of which will be discussed in more detail herein later.

The computing system 10 also includes a driver 70 to communicate with a corresponding device (not illustrated in FIG. 1) associated with (e.g., coupled to) the computing system 10. In various embodiments, the driver 70 includes a driver power management module 74 and a driver performance monitoring module 78, each of which will be discussed in more detail herein later. Although the computing system 10 is illustrated to include only one driver, in various other embodiments, the computing system 10 can include any other appropriate number of drivers.

The computing system 10 also includes a power management module 14 that is configured to dynamically manage one or more of the processing cores 12A, ..., 12D (e.g., facilitate distribution of workload among the processing cores 12A, ..., 12D), such that a power consumption of the computing system 10 is reduced.

The power management module 14 includes a memory profiler module 28. In various embodiments, the memory profiler module 28 is configured to collect memory information associated with a memory (not illustrated in FIG. 1) that is included in or coupled to the computing system 10. For example, the memory profiler module 28 is configured to probe (i) the driver performance monitoring module 78 included in the driver 70 and/or (ii) the OS 40 (e.g., the OS services module 44) to collect various memory statistics (e.g., an overall memory usage, a cache miss rate, a memory access rate, utilization of the memory by various instruction threads that are executed in the computing system 10, and/or any other appropriate memory associated information).

The power management module 14 also includes a plurality of idle profiler modules 24A, 24B, ..., 24D corresponding to the plurality of processing cores 12A, 12B, ..., 12D. For example, the idle profiler module 24A corresponds to the processing core 12A, the idle profiler module 24B corresponds to the processing core 12B, and so on. In various embodiments, each of the idle profiler modules 24A, ..., 24D collects utilization information of the associated processing. For example, the idle profiler module 24A collects utilization information of the processing core 12A, the idle profiler module 24B collects utilization information of the processing core 12B, and so on. For example, the OS idle module 56 generates utilization information of the processing cores 12A, ..., 12D, and the idle profiler modules 24A, ..., 24D collect respective utilization information from, for example, the OS idle module 56.

In an example, the utilization information of a processing core includes a utilization factor of the processing core. The utilization factor of a processing core is expressed as a percentage and is an indication of how busy the processing core is. For example, the utilization factor of the processing core 12A can be 60%, which indicates that the processing core 12A is operating at 60% of its capacity (e.g., indicates that the processing core 12A is operating at an active power mode for 60% of the time and at an idle power mode for 40% of the time).

The power management module 14 also includes a plurality of power profiler modules 20A, 20B, ..., 20D corresponding to the plurality of processing cores 12A, 12B, ..., 12D. For example, the power profiler module 20A corresponds to the processing core 12A, the power profiler module 20B corresponds to the processing core 12B, and so on. In various embodiments, a power profiler module (e.g., the power profiler module 20A) collects various power related information of the corresponding processing core (e.g., processing core 12A) and generates a corresponding power profile for the processing core.

FIG. 2 illustrates an exemplary Table 200 illustrating a plurality of power profiles for the plurality of processing cores 12A, ..., 12D, in accordance with an embodiment of the present disclosure. The Table 200 corresponds to an operating voltage v1 of the various processing cores. The operating voltage v1 is, for example, 1V. Although FIG. 2 illustrates a table corresponding to the operating voltage v1, similar tables corresponding to various other operating voltages are also generated, as will be discussed in more detail herein.

In various embodiments, the processing cores 12A, ..., 12D operate under one of two power modes—an active power mode (e.g., while the processing core is active and processes a plurality of instructions) and an idle power mode (e.g., while the processing core is inactive, idle and/or in a low power mode). Furthermore, a processing core can also be switched off (e.g., enter a deep sleep mode or turned off). A power consumed by a processing core is generally less in the idle power mode than that in the active power mode, and generally less in the off mode than that in the idle power mode.

In various embodiments, power consumption of a processing core (e.g., while the processing core is in the active power mode and/or the idle power mode) is also based on a frequency of operation of the processing core. For example, a power consumption of the processing core 12A at 250 MHz is relatively higher than a power consumption of the processing core 12A at 100 MHz.

Referring again to the Table 200 of FIG. 2, each row of the Table 200 indicates power profile of a corresponding processing core. For example, the first two rows of the Table 200 illustrate a power profile of the processing core 12A, the third and fourth rows of the Table 200 illustrate a power profile of the processing core 12B, and so on. The first column of the Table 200 indicates the processing core number, the second column indicates a power mode (e.g., the active power mode or the idle power mode) of the processing core, and the third column indicates a power consumption of the processing core, for the corresponding power mode, and for a plurality of frequencies.

For example, referring to the first row of the Table 200, at an operating voltage v1, while the processing core 12A is in an active power mode, power consumed by the processing core 12A at an operating frequency fa1 is AP_A_fa1. In the phrase AP_A_fa1, the term "AP" denotes that the processing core 12A is in the active power mode, the term "A" denotes that the power consumption is for the processing core 12A, and the term "fa1" indicates the operating frequency fa1 of the processing core 12A. Thus, AP_A_200 indicates a power consumption of the processing core 12A, while the processing core 12A is in the active power mode, at an operating voltage v1 and an operating frequency of 200 MHz.

As illustrated in Table 200, the first row also provides power consumption of the processing core 12A at operating frequencies fat, ..., fan (where "an" is an appropriate integer), while the processing core 12A is in the active power mode with the operating voltage v1. Similarly, the second row of the Table 200 indicates power consumptions of the processing core 12A, while in idle power mode, for operating voltage v1 and operating frequencies fa1, ..., fan. Thus, the first two rows of the Table 200 provide power consumption of the processing core 12A, while operating in the active and the idle power modes and at the operating voltage v1, for "an" number of frequencies fa1, ..., fan.

Similarly, the third and fourth row of the Table 200 provides power consumption of the processing core 12B, while operating in the active and the idle power modes and at the operating voltage v1, for "bn" number of frequencies fb1, ..., fbn, where "bn" is an appropriate integer.

As previously discussed, the Table 200 is for the operating voltage v1 of the various processing cores. As power consumption of a processing core is also a function of the operating voltage, the power profiler modules 20A, 20B, ..., 20D also generate power profiles for the processing cores 12A, ..., 12D for one or more other operating voltage levels of the processing cores 12A, ..., 12D (not illustrated in FIG. 2).

In various embodiments, the power profiles of various processing cores are generated using static and dynamic measurements. For example, the power profiler modules 20A, ..., 20D generate the power profiles of Table 200 using, for example, (i) prior power consumption knowledge of the processing cores and/or (ii) using information from the processing cores and/or the OS power management module 48. In various embodiments, the power profiler modules 20A, ..., 20D also dynamically update the power profiles using, for example, real time power consumption information from the processing cores and/or the OS power management module 48. In various embodiments, the dynamic updating of the power profiles can be based on additional power measurement devices (not illustrated in FIG. 1) in the computing system 10 (e.g., which measures power consumption of various processing cores).

The power management module 14 also includes a configuration lookup table (LUT) module 30, which is configured to generate a configuration LUT 32. In various embodiments, the configuration LUT 32 includes a plurality of candidate configurations, where each candidate configuration comprises corresponding operating conditions of the plurality of processing cores. FIG. 3 illustrates the configuration LUT 32, in accordance with an embodiment of the present disclosure. Various rows of the configuration LUT 32 illustrate various candidate configurations. M number of candidate configurations (where M is an appropriate integer) is illustrated in FIG. 3, although any other number of candidate configurations can be included in the configuration LUT 32. In various embodiments, the candidate configurations of the configuration LUT 32 is generated while configuring the computing system 10 and/or is dynamically refined during an operation of the computing system 10.

As illustrated in FIG. 3, each candidate configuration of the configuration LUT 32 includes corresponding operating conditions of various processing cores. For example, each candidate configuration of the configuration LUT 32 includes a status of the processing cores, i.e., whether each processing core is on (e.g., in the active power mode and/or the idle power mode) or is off (e.g., in a deep sleep mode or switched off). Also, each candidate configuration of the configuration LUT 32 includes an operating frequency, an operating voltage and a utilization factor of each processing core. For example, for the candidate configuration 1, the processing core 12A is on (e.g., in the active power mode and/or the idle power mode) and operates at an operating frequency of 200 MHz, operating voltage of 1V and with a utilization factor of 20%; the processing core 12B is on and operates at an operating frequency of 100 MHz, operating voltage of 1V and with a utilization factor of 50%, and so on, as illustrated in FIG. 3. Similarly, for the candidate configuration 2, the processing core 1 is on and operates at an operating frequency of 400 MHz, operating voltage of 0.8V and with a utilization factor of 92.5%; and the remaining processing cores 12B, 12C and 12D are off.

The power management module also 14 includes a policy management module 36. In various embodiments, based at least in part on the plurality of power profiles of the Table 200, the policy management module 36 selects, for managing the plurality of processing cores 12A, ..., 12D, a candidate configuration of the plurality of candidate configurations of the configuration LUT 32, as will be discussed in more detail herein.

In various embodiments, the policy management module 36 determines a combined power consumption of the processing cores 12A, ..., 12D for the candidate configurations 1, ..., M of FIG. 3, based on the power profiles of FIG. 2. For example, for the candidate configuration 1, the processing core 12A is on and operating at 200 MHz, 1V, and with a utilization factor of 20%. Thus, for 20% of the time, the processing core 12A is in the active power mode; and for 80% of the time, the processing core 12A is in the idle power mode. Accordingly, a power consumption of the processing core 12A is given by $((AP\_A\_200 \times 20\%) + (IP\_A\_200 \times 80\%))$. As previously discussed, $AP\_A\_200$ and $IP\_A\_200$ can be determined from the first and second row, respectively, of the Table 200 of FIG. 2 (i.e., from the power profile of the processing core 12A). Power consumptions of the other processing cores are also determined in a similar manner for the candidate configuration 1. Accordingly, a combined power consumption of all the four processing cores 12A, ..., 12D for the candidate configuration 1 is given by:

$$Power\_1 = ((AP\_A\_200 \times 20\%) + (IP\_A\_200 \times 80\%)) + \\ ((AP\_B\_100 \times 50\%) + (IP\_B\_100 \times 50\%)) + \\ ((AP\_C\_100 \times 45\%) + (IP\_C\_100 \times 55\%)) + \\ ((AP\_D\_200 \times 25\%) + (IP\_D\_200 \times 75\%))$$

Equation 1

In equation 1, an operating frequency of a processing core in the active power mode is assumed to be same as an operating frequency of the processing core in the idle power mode (e.g., operating frequencies of the processing core 12A is 200 MHz in both active and idle power modes). However, in various embodiments, an operating frequency of a processing core can be different (e.g., relatively less) in the idle power mode than that in the active power mode. As an example, operating frequencies of the processing cores 12A, ..., 12D can be 100 MHz in the idle power mode, irrespective of their respective operating frequencies in the active power mode. In such a case, a combined power consumption of all the four processing cores 12A, ..., 12D for the candidate configuration 1 is given by:

$$Power\_1a = ((AP\_A\_200 \times 20\%) + (IP\_A\_100 \times 80\%)) + ((AP\_B\_100 \times 50\%) + (IP\_B\_100 \times 50\%)) + ((AP\_C\_100 \times 45\%) + (IP\_C\_100 \times 55\%)) + ((AP\_D\_200 \times 25\%) + (IP\_D\_100 \times 75\%))$$

Equation 1a

A combined power consumptions of the processing cores for other candidate configurations can also be determined in a similar manner. For example, a combined power consumption of all the four processing cores 12A, ..., 12D for candidate configuration 2 is given by:

$$Power\_2 = ((AP\_A\_400 \times 92.5\%) + (IP\_A\_400 \times 7.5\%))$$

Equation 2

In Equation 2, the operating frequency of the processing core 12A in the active power mode is assumed to be same as the operating frequency of the processing core 12A in the idle power mode. Furthermore, in the candidate configuration 2, the processing cores 12B, 12C and 12D are off. Accordingly, power consumption associated with these processing cores are not reflected in Equation 2 (i.e., it is assumed that a processing core has zero or negligible power consumption when it is off). However, Equation 2 can be easily modified to include power consumption of a processing core when the processing core is off (e.g., by including low power consumption values corresponding to those processing cores that are off), as would be readily understood by those skilled in the art based on the teachings of this disclosure.

In various embodiments, if the operating frequency of the processing core 12A is different in the idle power mode (e.g., 100 MHz) than that in the active power mode, then the combined power consumption of all the four processing cores 12A, . . . , 12D for candidate configuration 2 is given by:

$$\text{Power\_2}a=((AP\_A\_400\times 92.5\%)+(IP\_A\_100\times 7.5\%)) \quad \text{Equation 2a}$$

In candidate configurations 1 and 2, the operating voltages of various processing cores are 1V, which is same as the operating voltage v1 of Table 200. Accordingly, Equations 1, 1a, 2 and 2a are based on the Table 200. However, if one or more processing cores have a different operating voltage for a candidate configuration (e.g., as in candidate configuration 3), then the corresponding combined power is suitably determined by including power consumptions from a table that is different from Table 200, as will be readily understood by those skilled in the art based on the teachings of this disclosure.

In various embodiments, once the combined power consumptions of the processing cores for the plurality of candidate configurations of the configuration LUT 32 are determined, a candidate configuration of the plurality of candidate configurations is selected for managing the plurality of processing cores 12A, . . . , 12D (e.g., for distributing workload or threads to the processing cores 12A, . . . , 12D) such that the power consumption of the computing system 10 is reduced (e.g., substantially minimized).

For example, if the computing system 10 operates on a multi-thread environment, various threads are distributed among the processing cores 12A, . . . , 12D based on the combined power consumptions of the processing cores for the plurality of candidate configurations. As an example, if there are p threads to be distributed among the four processing cores 12A, . . . , 12D, a first possibility is to distribute the threads in substantially a balanced manner (e.g., balanced to the extent possible) among the processing cores. As an example, for such load balancing, the processing core 12A can operate at frequency F1 with an utilization factor of U1, the processing core 12B can operate at frequency F2 with an utilization factor of U2, the processing core 12C can operate at frequency F3 with an utilization factor of U3, and the processing core 12D can operate at frequency F4 with an utilization factor of U1. In such a case (and assuming that the idle power mode and active power mode frequencies are same for a processing core), a combined power consumption of the processing cores 12A, . . . , 12D for the above discussed load balancing scenario is given by:

$$\text{Power\_load\_balance}=((AP\_A\_F1\times U1)+(IP\_A\_F1\times (1-U1)))+((AP\_B\_F2\times U2)+(IP\_B\_F2\times (1-U2)))+((AP\_C\_F3\times U3)+(IP\_C\_F3\times (1-U3)))+((AP\_D\_F4\times U4)+(IP\_D\_F4\times (1-U4))) \quad \text{Equation 3}$$

In various embodiments, the operating conditions of the load balance scenario of Equation 3 can correspond to one of the candidate configurations of the configuration LUT 32 (e.g., can correspond to the candidate configuration 1). Alternative (e.g., if the load balance scenario does not correspond to any of the candidate configurations), the load balance condition can be added as a candidate configuration in the configuration LUT 32.

As another example, all the threads of the computing system can be assigned to a single processing core (e.g., if the processing core has enough processing power to handle all the threads) and the remaining processing cores can remain off. For example, with only the processing core 12A being on and all other processing cores being off, the combined power consumption Power_A=((AP_A_F11×U11)+(IP_A_F11×(1-U11))), where F11 is the operating frequency and U11 is the utilization factor of the processing core 12A under this condition. Similarly, the combined power consumptions Power_B, Power_C and Power_D are also determined, which correspond to candidate configurations with only the processing core 12B being on, only the processing core 12C being on, and only the processing core 12D being on, respectively. As an example, the configuration corresponding to only the processing core 12A being on is illustrated as candidate configuration 2 in FIG. 2.

If, for example, the processing core 12A singlehandedly cannot meet the load demand (e.g., cannot execute all the threads) in spite of being, for example, at a highest frequency setting and/or at a highest utilization factor setting (e.g., 100% utilization factor), then the corresponding configuration (i.e., with only the processing core 12A being on) is deemed to be infeasible and not considered while selecting a candidate configuration for managing the processing cores. In another example, combined power consumptions of only feasible candidate configurations (e.g., those candidate configurations that can meet the load demand of the computing system) are determined.

If two or more processing cores have substantially similar properties (e.g., substantially similar power consumption under substantially similar operating conditions), power consumption calculation for only one processing core can be performed and used for all the other similar processing cores.

Once all the possible combined power consumptions are determined corresponding to all possible and feasible candidate configurations, a candidate configuration, which corresponds to a substantially minimum combined power consumption among all the possible combined power consumptions, is selected. For example, $$\text{Power\_min}=\text{Minimum}(\text{Power\_1},\text{Power\_2},\ldots,\text{Power\_M},\text{Power\_load\_balance},\text{Power\_A},\ldots,\text{Power\_D}), \quad \text{Equation 4}$$

and the candidate configuration corresponding to the Power_min is selected. Subsequently, the selected configuration is used to manage the processing cores. For example, the selected configuration is used to schedule operation of the processing cores and distribute load across the processing cores. For example, if the candidate configuration 3 of FIG. 3 is selected, (i) the processing cores 12A and 12B remains off, (ii) the processing core 12C operates with an operating voltage of 0.8V, operating frequency of 150 MHz and an utilization factor of 60%, and (iii) the processing core 12D operates with an operating voltage of 1V, operating frequency of 250 MHz and an utilization factor of 96%.

In various embodiments, the policy management module 36 transmits the selected candidate configuration to the OS scheduling module 52. The OS scheduling module 52 schedules the operations of the processing cores and distributes load across the processing cores based on the received candidate configuration.

In various embodiments, the policy management module 36 can also take various other factors in account while selecting the candidate configuration for managing the processing cores. For example, the policy management module 36 can also take into account memory information generated and/or collected by the memory profiler module 28 while selecting the candidate configuration for managing the processing cores. For example, memory information generated and/or collected by memory profiler module 28 can be used to characterize memory composition of workloads and/or improve the utilization factors. In an embodiment, this may help in developing the power predictions and/or in configuring the processing cores.

Figure 4:
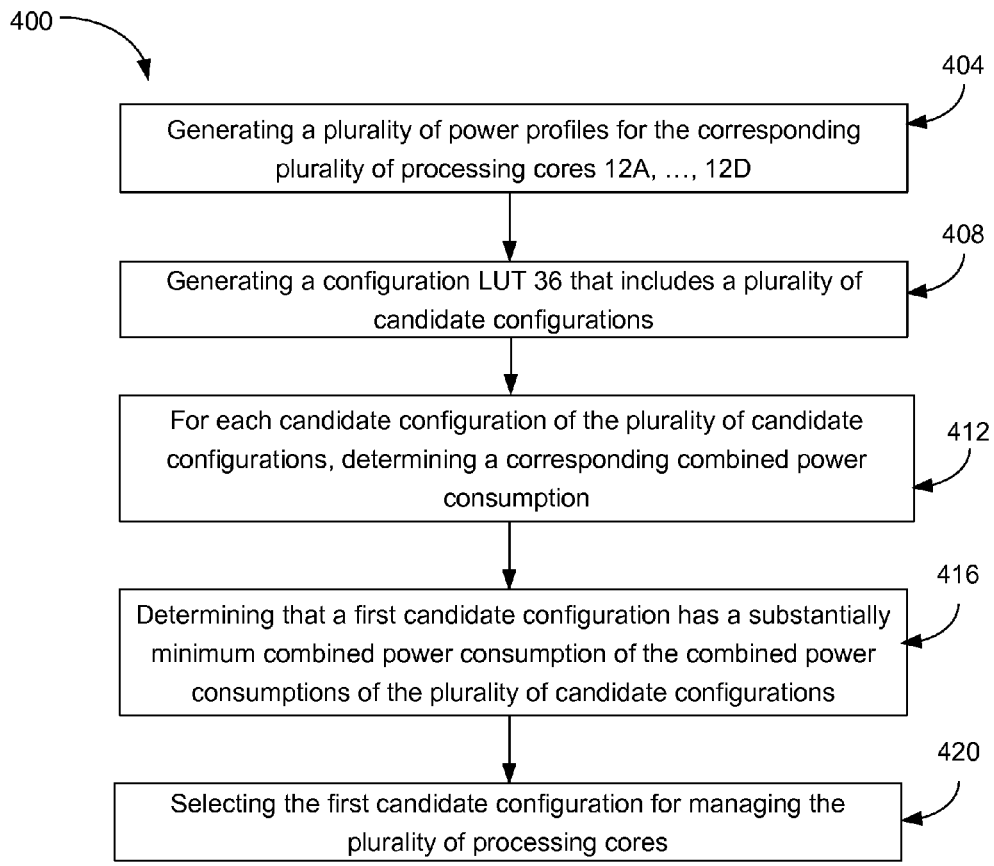
FIG. 4 illustrates an example method for operating the computing system of FIG. 1, in accordance with an embodiment of the present disclosure.

FIG. 4 illustrates an exemplary method 400 for operating the computing system 10 of FIG. 1, in accordance with an embodiment of the present disclosure. At 404, the plurality of power profiler modules 20A, . . . , 20D generate a plurality of power profiles (e.g., as illustrated in FIG. 2) for the corresponding plurality of processing cores 12A, . . . , 12D. In various embodiments, each power profile of the plurality of power profiles includes power consumptions of a corresponding processing core under various operating conditions. For example, a power profile corresponding to the processing core 12A includes power consumptions of the processing core 12A under operating voltage v1, operating frequencies fa1, . . . , fan, and while the processing core 12A operates in the active and idle power mode, as illustrated in the first two rows of the Table 200 of FIG. 2.

At 408, the configuration LUT module 30 generates the configuration LUT table 32. The configuration LUT table 32 includes a plurality of candidate configurations (e.g., candidate configurations 1, . . . , M, as illustrated in FIG. 3), where each candidate configuration comprises corresponding candidate operating conditions (e.g., operating frequencies, operating voltages, utilization factors of the processing cores, and whether the processing cores are on or off) for the plurality of processing cores.

At 412, the policy management module 36 determines, for each candidate configuration of the plurality of candidate configurations, a corresponding combined power consumption. For example, for the candidate configuration 1 of FIG. 3, the policy management module 36 determines combined power Power_1 and/or Power_1a using Equations 1 and/or 1a. For a candidate configuration, the combined power consumption is an indication of power consumed by the plurality of processing cores under the candidate operating conditions of the corresponding candidate configuration.

At 416, the policy management module 36 determines that a first candidate configuration has a substantially minimum combined power consumption of the combined power consumptions of all the candidate configurations (e.g., as discussed with respect to Equation 4).

At 420, the policy management module 36 selects the first candidate configuration of the plurality of candidate configurations for managing the plurality of processing cores 12A, . . . , 12D. For example, the policy management module 36 transmits the first candidate configuration to the OS scheduling module 52, and the OS scheduling module 52 schedules the operations of the processing cores 12A, . . . , 12D and distributes load among the processing cores 12A, . . . , 12D based on the first candidate configuration.

In the method 400, one or more operations may occur in an order that is different from that illustrated in FIG. 4. For example, generation of the configuration LUT 36 at 408 can be prior to, at least partially concurrent with, or subsequent to the generation of the power profiles at 404.

The computing system 10 has several advantages over a conventional multi-core computing system. For example, in a conventional multi-core computing system, workload is distributed among multiple processing cores without taking into account power consumptions of the processing cores and/or a combined power consumption of the conventional multi-core computing system. In contrast, in the computing system 10, workload is distributed among multiple processing cores in such a way that reduces (e.g., substantially minimizes) a combined power consumption of the processing cores, without adversely affecting the processing capability of the computing system 10. Thus, the computing system 10 uses relatively less power compared to the conventional multi-core computing system.

In accordance with various embodiments, an article of manufacture may be provided that includes a storage medium having instructions stored thereon that, if executed, result in the operations described herein with respect to the method 400 of FIG. 4 (and/or various other operations discussed in the present disclosure). In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
generating a plurality of power profiles for a corresponding plurality of processing cores of a computing system, wherein each power profile of the plurality of power profiles includes power consumptions of a corresponding processing core under various operating conditions;
selecting, from a plurality of candidate configurations, a subset of the plurality of candidate configurations, such that each candidate configuration of the subset of the plurality of candidate configurations is a feasible candidate configuration, wherein each candidate configuration of the plurality of candidate configurations comprises corresponding candidate operating conditions for the plurality of processing cores, wherein a candidate configuration is a feasible candidate configuration if candidate operating conditions associated with the candidate configuration are able to meet a current load demand of the computing system;

for each candidate configuration of the subset of the plurality of candidate configurations, determining a corresponding combined power consumption, such that a plurality of combined power consumptions is determined corresponding to the subset of the plurality of candidate configurations; and based on the plurality of combined power consumptions, selecting a first candidate configuration of the subset of the plurality of candidate configurations for managing the plurality of processing cores, wherein a first combined power consumption of the plurality of combined power consumptions corresponds to the first candidate configuration of the subset of the plurality of candidate configurations, wherein the first combined power consumption is determined such that the first combined power consumption is a function of $$(AP\_A\_fa1 \times Ua) + (IP\_A\_fa2 \times (1-Ua)) + (AP\_B\_fb1 \times Ub) + (IP\_B\_fb2 \times (1-Ub)) + \ldots + ((AP\_N\_fn1 \times Un) + (IP\_N\_fn2 \times (1-Un)),$$

wherein the plurality of processing cores comprises processing cores A, B, . . . , N, wherein the first candidate configuration of the subset of the plurality of candidate configurations indicate that the processing cores A, B, . . . , N operate (i) at an active power mode, at frequencies fa1, fb1, . . . , fn1, respectively, and with utilization factors Ua, Ub, . . . , Un, respectively, and (ii) at an idle power mode, at frequencies fa2, fb2, . . . , fn2, respectively, wherein AP_A_fa1, AP_B_fb1, . . . , AP_N_fn1 represent power consumed by processing cores A, B, . . . , N, respectively, while the processing cores A, B, . . . , N operate at the active power mode, at frequencies fa1, fb1, . . . , fn1, respectively, and wherein IP_A_fa2, IP_B_fb2, . . . , IP_N_fn2 represent power consumed by processing cores A, B, . . . , N, respectively, while the processing cores A, B, . . . , N operate at the idle power mode, at frequencies fa2, fb2, . . . , fn2, respectively.

2. The method of claim 1, wherein:
a first power profile of the plurality of power profiles includes (i) a first power consumption of a first processing core under various operating conditions and while the first processing core is operating at an active power mode, and (ii) a second power consumption of the first processing core under various operating conditions and while the first processing core is operating at an idle power mode.

3. The method of claim 1, wherein:
a combined power consumption corresponding to a specific candidate configuration of the subset of the plurality of candidate configurations represents a combined power consumed by the plurality of processing cores while the plurality of processing cores operate in accordance with the specific candidate configuration.

4. The method of claim 1, wherein selecting the first candidate configuration of the subset of the plurality of candidate configurations comprises:
determining that a first combined power consumption is substantially minimum among the plurality of combined power consumptions, wherein the first combined power consumption corresponds to the first candidate configuration of the subset of the plurality of candidate configurations; and based on determining that the first combined power consumption is substantially minimum among the plurality of combined power consumptions, selecting the first candidate configuration of the subset of the plurality of candidate configurations for managing the plurality of processing cores.

5. The method of claim 1, wherein selecting the subset of the plurality of candidate configurations comprises:
generating the plurality of candidate configurations; and
selecting, from the generated plurality of candidate configurations, the subset of the plurality of candidate configurations.

6. The method of claim 1, further comprising:
managing the plurality of processing cores by operating the plurality of processing cores in accordance with the selected first candidate configuration.

7. The method of claim 1, wherein each power profile of the plurality of power profiles includes power consumptions of the corresponding processing core under various operating conditions such that the various operating conditions comprise a plurality of operating frequencies and a plurality of operating voltages.

8. The method of claim 1, wherein a candidate configuration of the plurality of candidate configurations comprises (i) an operating frequency for each of the plurality of processing cores, (ii) an operating voltage for each of the plurality of processing cores, (iii) a utilization factor for each of the plurality of processing cores, and (iv) whether each of the plurality of processing cores is in an on state or an off state.

9. The method of claim 1, wherein for a second candidate configuration of the subset of the plurality of candidate configurations, determining a corresponding combined power consumption further comprises:
based on the plurality of power profiles, determining a corresponding power consumed by each of the plurality of processing cores while the plurality of processing cores operates in accordance with the second candidate configuration; and based on determining the corresponding power consumed by each of the plurality of processing cores while the plurality of processing cores operates in accordance with the second candidate configuration, determining the combined power consumption corresponding to the second candidate configuration.

10. The method of claim 9, wherein for the second candidate configuration of the subset of the plurality of candidate configurations, determining the corresponding combined power consumption further comprises:
determining the combined power consumption corresponding to the second candidate configuration by summing the power consumed by each of the plurality of processing cores while the plurality of processing cores operates in accordance with the second candidate configuration.

11. A computing system comprising:
a plurality of processing cores;
a plurality of power profiler modules corresponding to the plurality of processing cores, wherein each power profiler module is configured to generate a power profile for a corresponding processing core such that a plurality of power profiles is generated corresponding to the plurality of processing cores, and wherein each power profile of the plurality of power profiles includes power consumptions of a corresponding processing core under various operating conditions;
a configuration lookup table module configured to select, from a plurality of candidate configurations, a subset of the plurality of candidate configurations, such that each candidate configuration of the subset of the plurality of candidate configurations is a feasible candidate configuration, wherein each candidate configuration of the plurality of candidate configurations comprises corresponding candidate operating conditions for the plurality of processing cores, wherein a candidate configuration is a feasible candidate configuration if candidate operating conditions associated with the candidate configuration are able to meet a load demand of the computing system; and a policy management module configured to
  for each candidate configuration of the subset of the plurality of candidate configurations, determine a corresponding combined power consumption, such that a plurality of combined power consumptions is determined corresponding to the subset of the plurality of candidate configurations, and
  based on the plurality of combined power consumptions, select a first candidate configuration of the subset of the plurality of candidate configurations for managing the plurality of processing cores,
wherein a first combined power consumption of the plurality of combined power consumptions corresponds to the first candidate configuration of the subset of the plurality of candidate configurations, wherein the first combined power consumption is determined such that the first combined power consumption is a function of $$(AP\_A\_fa1 \times Ua) + (IP\_A\_fa2 \times (1-Ua)) + (AP\_B\_fb1 \times Ub) + (IP\_B\_fb2 \times (1-Ub)) + \ldots + ((AP\_N\_fn1 \times Un) + (IP\_N\_fn2 \times (1-Un))),$$

wherein the plurality of processing cores comprises processing cores A, B, . . . , N,
wherein the first candidate configuration of the subset of the plurality of candidate configurations indicate that the processing cores A, B, . . . , N operate (i) at an active power mode, at frequencies fa1, fb1, . . . , fn1, respectively, and with utilization factors Ua, Ub, . . . , Un, respectively, and (ii) at an idle power mode, at frequencies fa2, fb2, . . . , fn2, respectively,
wherein AP_A_fa1, AP_B_fb1, . . . , AP_N_fn1 represent power consumed by processing cores A, B, . . . , N, respectively, while the processing cores A, B, . . . , N operate at the active power mode, at frequencies fa1, fb1, . . . , fn1, respectively, and
wherein IP_A_fa2, IP_B_fb2, . . . , IP_N_fn2 represent power consumed by processing cores A, B, . . . , N, respectively, while the processing cores A, B, . . . , N operate at the idle power mode, at frequencies fa2, fb2, . . . , fn2, respectively.

12. The computing system of claim 11, wherein:
a first power profile of the plurality of power profiles includes (i) a first power consumption of a first processing core under various operating conditions and while the first processing core is operating at an active power mode, and (ii) a second power consumption of the first processing core under various operating conditions and while the first processing core is operating at an idle power mode.

13. The computing system of claim 11, wherein:
a combined power consumption corresponding to a specific candidate configuration of the subset of the plurality of candidate configurations represents a combined power consumed by the plurality of processing cores while the plurality of processing cores operate in accordance with the specific candidate configuration.

14. The computing system of claim 11, wherein the policy management module is configured to select the first candidate configuration of the subset of the plurality of candidate configurations by:
determining that a first combined power consumption is substantially minimum among the plurality of combined power consumptions, wherein the first combined power consumption corresponds to the first candidate configuration of the subset of the plurality of candidate configurations; and
based on determining that the first combined power consumption is substantially minimum among the plurality of combined power consumptions, selecting the first candidate configuration of the subset of the plurality of candidate configurations for managing the plurality of processing cores.

15. The computing system of claim 11, wherein the configuration lookup table module is configured to select the subset of the plurality of candidate configurations by:
generating the plurality of candidate configurations; and
selecting, from the generated plurality of candidate configurations, the subset of the plurality of candidate configurations.

16. The computing system of claim 11, further comprising:
a scheduler configured to manage the plurality of processing cores by operating the plurality of processing cores in accordance with the selected first candidate configuration.

17. The computing system of claim 11, further comprising:
a scheduler configured to manage the plurality of processing cores by distributing a plurality of instruction threads among the plurality of processing cores based on the first candidate configuration.

18. The computing system of claim 11, wherein each power profile of the plurality of power profiles includes power consumptions of the corresponding processing core under various operating conditions such that the various operating conditions comprise a plurality of operating frequencies and a plurality of operating voltages.

19. The computing system of claim 11, wherein a candidate configuration of the plurality of candidate configurations comprises (i) an operating frequency for each of the plurality of processing core, (ii) an operating voltage for each of the plurality of processing core, (iii) a utilization factor for each of the plurality of processing core, and (iv) whether each of the plurality of processing cores is in an on state or an off state.

20. The computing system of claim 11, wherein a system on a chip (SOC) comprises the computing system.

* * * * *